Patented May 1, 1923.

1,453,660

UNITED STATES PATENT OFFICE.

GUILLAUME DE MONTMOLLIN, GÉRALD BONHÔTE, AND JOSEF SPIELER, OF BASEL, SWITZERLAND, ASSIGNORS TO SOCIETY OF CHEMICAL INDUSTRY IN BASLE, OF BASEL, SWITZERLAND.

AZO DYESTUFFS AND PROCESS FOR THE MANUFACTURE OF SAME.

No Drawing.     Application filed February 6, 1923.   Serial No. 617,385.

*To all whom it may concern:*

Be it known that we, GUILLAUME DE MONTMOLLIN, GÉRALD BONHÔTE, and JOSEF SPIELER, all citizens of the Swiss Republic, and residents of Basel, Switzerland, have invented new and useful Azo Dyestuffs and Processes for the Manufacture of Same, of which the following is a full, clear, and exact specification.

This invention relates to the manufacture of dyestuffs which are technically of great value by coupling with a diazo-compound (in certain cases with elimination of 1 or 2 molecular proportions of carbon dioxide) 1 or 2 carbonyl derivatives derived from 1-oxynaphthalene-4-carboxylic acid and of the general formula

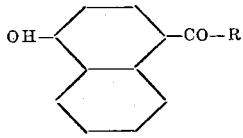

wherein R signifies a complex which consists in at least one aromatic nucleus, for example the 4:4'-dioxynaphthylketone-3:3-dicarboxylic acid obtainable by the process described in the U. S. patent application Serial No. 549550, filed April 4th, 1922, the 4:4'-dioxydinaphthylketone which can be obtained by the processes described in the original U. S. patent application Serial No. 561920, filed May 18th, 1922, and in another U. S. patent application, recently filed, the arylides of 1-oxynaphthalene-4-carboxylic acid which can be prepared by the action of an aromatic amine on one of the ethereal salts of 1-oxynaphthalene-4-carboxylic acid named in the original U. S. patent application Serial No. 561920, filed May 18th, 1922, or a 4-oxynaphthalene-1-arylketone, or a carboxylic acid derivative thereof capable of being obtained by the processes described in the U. S. patent application Serial No. 575-579, filed July 17th, 1922, and in another U. S. patent application, recently filed. The new dyestuffs thus obtained, which constitute orange to blue and brownish black powders soluble to insoluble in water and producing on the material to which they are applied orange to violet blue and brownish black tints, correspond with the general formula

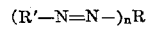

wherein $n$ signifies a whole number smaller than 3, R any armomatic complex which may contain substituents, and R' the radical of the already mentioned carbonyl derivative derived from the 1-oxynaphthalene-4-carboxylic acid which may also contain other substituents. According to the nature of the diazo-compound used, an acid dyestuff may be produced suitable for wool, or a dyestuff suitable for the manufacture of pigments and lakes, or a dyestuff formed on the fiber in the same manner as paranitraniline red is produced. In this latter case particularly remarkable results are obtained by employing unsulfonated diazo-compounds corresponding with the general formula

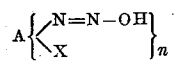

in which $n$ is a whole number smaller than 3, A an aromatic complex which may contain substituents, and X a group —O—R (in which R is an alkyl, aryl and aralkyl radical) in ortho-position to the diazo-group. Generally speaking, the dyestuffs or the dyeings produced by them are distinguished by their vividness, their intensity and their fastness.

The following examples illustrate the invention without limiting it, the parts being by weight:—

Example I.

102 parts of 1-methoxy-2-amino-benzene-4-sulfonic acid are diazotized in the usual manner and the diazo-compound thus obtained is introduced into a mixture of 201 parts of 4:4'-dioxydinaphthylketone-3:3'-dicarboxylic acid, 150 parts of anhydrous sodium carbonate and 1000 parts of ice. Coupling occurs rapidly with elimination of a molecular proportion of carbon dioxide; when it is completed the mixture is heated, after addition of a small proportion of common salt, and is then filtered. The dyestuff thus obtained dyes wool a red which is slightly violet, the tints obtained being fast to washing, light and alkalies. By substituting in this example for the diazo-compound mentioned one which is obtained from a sulfonated derivative of toluidine, a scarlet dyestuff may be obtained.

*Example 2.*

86 parts of metanilic acid are diazotized in the usual manner and the diazo-compound produced is added to a mixture of 1000 parts of ice, 196 parts of 4-oxynaphthalene-1-phenylketone-3-carboxylic acid and 100 parts of anhydrous sodium carbonate. Coupling occurs rapidly with elimination of a molecular proportion of carbon dioxide; the dyestuff is isolated as indicated in Example 1. It dyes wool in an acid bath orange red. When precipitated with a salt of barium it yields red lakes of excellent fastness to water, oil and light.

The same dyestuff is obtained if 4-oxynaphthalene-1-phenylketone be substituted for the 4-oxy-naphthalene-1-phenylketone-3-carboxylic acid. These ketones combine with diazo-compounds of the naphthalene series, such as 2-naphthylamine-1-(or 6-) sulfonic acid, to yield dyestuffs which give with suitable mineral salts blood red lakes and dye wool vivid red tints fast to washing.

*Example 3.*

163 parts of 4-oxynaphthalene-1-(2'-chloro)-phenylketone-3-carboxylic acid are dissolved in a mixture of 1000 parts of water and 100 parts of anhydrous sodium carbonate; there are then added 111 parts of the phenyl ether of 4-chloro-2-amino-1-phenol which has been diazotized. A vivid red dyestuff is precipitated which yields lakes of excellent fastness. The same dyestuff is obtained by using 4-oxynaphthalene-1-(2'-chloro)-phenylketone.

*Example 4.*

Cotton is prepared in the usual manner with an alkaline solution containing per litre 20 grams of 4:4'-dioxy-1:1'-dinaphthylketone and is then passed through a bath containing per litre 10.7 grams of diazotized orthotoluidine. The cotton is dyed an intense red; the tint is fast to washing and to light.

*Example 5.*

Cotton is prepared in the usual manner with an alkaline solution containing per litre 30 grams of the anilide of 1-oxynaphthalene-4-carboxylic acid and is then passed through a bath containing per litre 22.5 grams of ortho-amino-azo-toluene which has been diazotized. The cotton is dyed an intense bordeaux tint, fast to light, washing and chlorine.

*Example 6.*

Cotton is prepared in the usual manner with an alkaline solution containing per litre 20 grams of 4-oxynaphthalene-1-phenylketone and passed through a bath containing per litre 17.7 grams of diazotized 1-chloro-2-naphthylamine. The cotton is dyed a blood red tint which is very vivid and intense. The tint is fast to light and to washing.

*Example 7.*

The fabric to be printed is padded with an alkaline bath containing per litre 15.5 gr. of 4:4'-dioxy-1:1'-dinaphthylketone and is then printed in the usual manner with a printing paste containing per litre 15.8 grams of 5-nitro-2-amino-1-methoxybenzene which has been diazotized. The dark bluish red color is developed immediately and is very fast. By soaping the not printed portions are made white. The same result is obtained by impregnating the fiber with the corresponding quantity of the 4,4'-dioxy-1,1'-dinaphthylketone-3,3'-dicarboxylic acid.

The following table indicates tints which may be obtained by dyestuffs made in accordance with the invention.

| Carbonyl derivative. | Base diazotized. | Tint. |
|---|---|---|
| 4:4'-dioxydinaphthylketone-3:3'-dicarboxylic acid or 4:4'-dioxydinaphthyletone. | Anisidinesulfonic acid (NH$_2$:2, OCH$_3$:1, SO$_3$H:4). | Blood red. |
| Do | Ortho-toluidine-sulfonic acid (CH$_3$:1, NH$_2$:2, SO$_3$H:4). | Scarlet. |
| Do | Para-toluidinesulfonic acid (CH$_3$:1, NH$_2$:4, SO$_3$H:3). | Scarlet. |
| Do | Dianisidine | Brownish black. |
| Do | Ortho-toluidine | Red. |
| 4-oxynaphthalene-1-phenyl-ketone-3-carboxylic acid and 4-oxynaphthalene-1-phenyl-ketone. | Metanilic acid | Red. |
| Do | Sulfanilic acid | Red. |
| Do | Naphthionic acid (NH$_2$:1, SO$_4$H:4). | Violet red. |
| Do | Naphthionic acid (NH$_2$:2, SO$_3$H:1). | Red. |
| Do | Naphthionic acid (NH$_2$:2, SO$_3$H:6). | Red. |
| Do | Paranitraniline | Orange red. |
| Do | Chloro-anisidine (Cl:4, OCH$_3$:1, NH$_2$:2). | Vivid red. |
| Do | Nitro-ortho-toluidine (NO$_2$:4, CH$_3$:1, NH$_2$:2). | Vivid red. |
| Do | Nitro-anisidine (NO$_2$:5, OCH$_3$:1, NH$_2$:2). | Red. |
| Do | Para-chloraniline | Orange red. |
| Do | Dichloraniline | Orange red. |
| Do | α-naphthylamine | Garnet. |
| Do | Chloro-β-naphthylamine (Cl:1, NH$_2$:2). | Red. |
| Do | Phenyl-ether of 4-chloro-2-amino-1-phenol. | Scarlet. |
| Do | Para-cresyl-ether of 4-chloro-2-amino-1-phenol. | Scarlet. |
| Do | Benzyl-ether of 4-chloro-2-amino-1-phenol. | Blood red. |
| Do | 4'-chlorophenyl-ether of 4-chloro-2-amino-1-phenol. | Scarlet orange. |
| Do | 4-chloro-3-cresyl-ether of 4-chloro-2-amino-1-phenol. | Scarlet. |
| Do | Phenyl ether of 2-amino-1-phenol. | Red. |

| Carbonyl derivative. | Base diazotized. | Tint. |
|---|---|---|
| Do | Benzylether of 3-amino-1-methyl-4-phenol. | Violet red. |
| Do | Phenyl ether of 4-ethyl-sulfon - 2 - amino - 1 - phenol. | Scarlet orange. |
| Do | Benzidine | Puce. |
| Do | Dianisidine | Very violet blue. |
| Do | 4:4′ - diaminodiphenyl-amine. | Brownish black. |
| Do | Diaminodiphenyl-ether | Red. |
| Do | Ortho - amino - azo -tol-uene. | Garnet. |
| 4 - oxynaphthalene -1 - (2′ - chloro) - phenyl-ketone - 3 - carboxylic acid and 4-oxynaph-thalene - 1 - (2′-chloro)-phenylketone. | Chloro - β - naphthyl-amine (Cl:1,NH₂:2). | Red. |
| Do | Benzyl ether of 4-ethyl-sulfon - 2 - aminophe-nol. | Blood red. |
| Do | Dianisidine | Very violet blue. |
| 4 - oxynaphthalene - 1 - (4′-cholro) - phenylke-tone-3-carboxylic acid and 4-oxynaphthal-ene-1- (4′ - chloro) - phenylketone. | Phenyl ether of 4-chlo-ro - 2 - amino - 1 - phe-nol. | Scarlet. |
| 4 - oxynaphthalene - 1 - (2′4′ - dichloro) - phe-nylketone - 3 - carbox-ylic acid and 4-oxy-naphthalene - 1 - (2′4′-chloro)- phenylketone 1 - chloro - 2:1′ - dinaph-thylketone - 4′ - oxy-3′-carboxylic acid and 1 - chloro - 4′ - oxy-2:1′-dinaphthylketone. | ......do.............. | Do. |
| Do | Phenyl ether of 4-chlo-ro-2-amino-1-phenol. | Blood red. |
| Do | Benzyl ether of 4-chlo-ro-2-amino-1-phenol. | Blood red. |
| Do | Dianisidine | Very violet blue. |
| Anilide of 1-oxynaph-thalene - 4 - carboxylic acid. | Phenyl ether of 4-chlo-ro-2-amino-1-phenol. | Scarlet. |
| Para-toluidide of 1-oxy-naphthalene-4-car-boxylic acid. | ......do.............. | Do. |
| Methylanilide of 1-oxy-naphthalene-4-car-boxylic acid. | ......do.............. | Do. |

What we claim is:

1. The herein described manufacture of new azo-dyestuffs by combining carbonyl derivatives derived from 1-oxynaphthalene-4-carboxylic acid and of the general formula

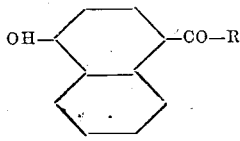

wherein R signifies a complex which consists in at least one aromatic nucleus, with diazo-compounds.

2. The herein described manufacture of new azo-dyestuffs by combining unsulfonated carbonyl derivatives derived from 1-oxynaphthalene-4-carboxylic acid and of the general formula

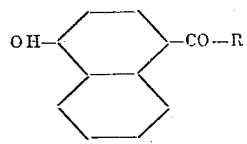

wherein R signifies a complex which consists in at least one aromatic nucleus, with unsulfonated diazo-compounds.

3. The herein described production of new dyestuffs on the fiber by treating the fiber first with unsulfonated carbonyl derivatives derived from 1-oxynaphthalene-4-carboxylic acid and of the general formula

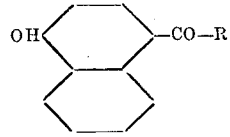

wherein R signifies a complex which consists in at least one aromatic nucleus, and then with unsulfonated diazo-compounds.

4. The herein described manufacture of new azo-dyestuffs by combining unsulfonated 4-oxynaphthalene-1-arylketones with unsulfonated diazo-compounds.

5. The herein described production of new dyestuffs on the fiber by treating the fiber first with unsulfonated 4-oxynapththalene-1-arylketones and then with unsulfonated diazo-compounds.

6. The herein described production of new dyestuffs on the fiber by treating the fiber first with unsulfonated and uncarboxylated 1-oxynaphthalene-1-arylketones and then with unsulfonated diazo-compounds.

7. The herein described production of new dyestuffs on the fiber by treating the fiber first with unsulfonated and uncarboxylated 1-oxynaphthalene-1-arylketones and then with unsulfonated diazo-compounds corresponding with the general formula

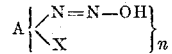

wherein $n$ signifies a whole number smaller than 3, A an aromatic complex which may contain substituents, and X a group —O—R (wherein R represents an alkyl, aryl, and aralkyl radical) in ortho-position to the diazo-group.

8. The herein described production of new dyestuffs on the fiber by treating the fiber first with unsulfonated and uncarboxylated 1-oxynaphthalene-1-arylketones and then with unsulfonated diazo - compounds corresponding with the general formula $$A\underset{X}{\overset{N=N-OH}{\diagup}}$$

wherein A signifies an aromatic complex which may contain substituents, and X a group —O—R (wherein R represents an alkyl, aryl, and aralkyl radical) in ortho-position to the diazo-group.

9. The herein described new dyestuffs resulting from the action of diazo-compounds on the carbonyl derivatives derived from 1-oxy-naphthalene-4-carboxylic acid corresponding with the general formula $$(R'-N=N-)_nR$$

wherein $n$ signifies a whole number smaller than 3, R any aromatic complex which may contain substituents, and R′ the radical of a carbonyl derivative derived from 1-oxynaphthalene-4-carboxylic acid and of the general formula

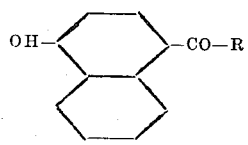

wherein R signifies a complex which consists in at least one aromatic nucleus, which dyestuffs constitute orange to blue and brownish black powders soluble to insoluble in water, producing on the material to which they are applied orange to violet blue and brownish black tints.

10. The herein described new dyestuffs resulting from the action of unsulfonated diazo-compounds on the carbonyl derivatives derived from 1-oxynaphthalene-4-carboxylic acid corresponding with the general formula

wherein $n$ signifies a whole number smaller than 3, R an unsulfonated aromatic complex which may contain other substituents, and R' the radical of a carbonyl derivative derived from 1-oxynaphthalene-4-carboxylic acid and of the general formula

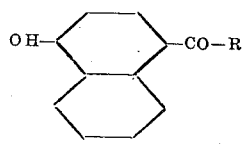

wherein R signifies a complex which consists in at least one aromatic nucleus, which dyestuffs constitute orange to blue and brownish black powders insoluble in water, producing on the fiber to which they are applied orange to blue and brownish black tints.

11. The herein described new dyestuffs resulting from the action of unsulfonated diazo-compounds on the unsulfonated derivatives of 4-oxynaphthalene-1-arylketones corresponding with the general formula

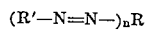

wherein $n$ signifies a whole number smaller than 3, R an unsulfonated aromatic complex which may contain other substituents, and R' the radical of an unsulfonated 4-oxynaphthalene-1-arylketone, which dyestuffs constitute orange to blue and brownish black powders insoluble in water, producing on the fiber to which they are applied orange to blue and brownish black tints.

12. The herein described new dyestuffs resulting from the action of unsulfonated diazo-compounds on the unsulfonated derivatives of the 4-oxynaphthalene-1-arylketones corresponding with the general formula

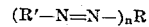

wherein $n$ signifies a whole number smaller than 3, R an unsulfonated aromatic complex comprising, besides other eventual substituents, a group —O—R (wherein R may represent an alkyl, aryl, and aralkyl radical) in ortho-position to the azo-groups, and R' the radical of an unsulfonated 4-oxynaphthalene-1-arylketone, which dyestuffs constitute orange to dark black blue powders insoluble in water, producing on the fiber to which they are applied orange to violet blue tints.

13. The herein described new dyestuffs resulting from the action of unsulfonated diazo-compounds on the unsulfonated derivatives of the 4-oxynaphthalene-1-arylketones corresponding with the general formula

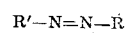

wherein R signifies an unsulfonated aromatic complex comprising, besides other eventual substituents, a group —O—R (wherein R may represent an alkyl, aryl and aralkyl radical) in ortho-position to the azo-groups, and R' the radical of an unsulfonated 4-oxynaphthalene-1-arylketone, which dyestuffs constitute orange to brownish-violet red powders, producing on the fiber to which they are applied orange to blue red tints.

14. Materials dyed with the new azo-dyestuffs resulting from the action of unsulfonated diazo-compounds on the carbonyl derivatives derived from 1-oxynaphthalene-4-carboxylic acid corresponding with the general formula

wherein $n$ signifies a whole number smaller than 3, R an unsulfonated aromatic complex which may contain other substituents, and R' the radical of a carbonyl derivative derived from 1-oxynaphthalene-4-carboxylic acid and of the general formula

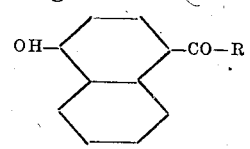

wherein R signifies a complex which consists in at least one aromatic nucleus, the dyes being of orange to blue and brownish black tints.

15. Materials dyed with the new azo-dyestuffs resulting from the action of unsulfonated diazo-compounds on the unsulfonated derivatives of 4-oxynaphthalene-1-arylketones corresponding with the general formula

wherein $n$ signifies a whole number smaller than 3, R an unsulfonated aromatic complex which may contain other substituents, and R' the radical of an unsulfonated 4-oxynaphthalene-1-arylketone, the dyes being of orange to blue and brownish black tints.

16. Materials dyed with the new azo-dyestuffs resulting from the action of unsulfonated diazo-compounds on the unsulfonated derivatives of the 4-oxynaphthalene-1-arylketones corresponding with the general formula $$(R'-N=N-)_nR$$

wherein $n$ signifies a whole number smaller than 3, R an unsulfonated aromatic complex comprising, besides other eventual substituents, a group —O—R (wherein R may represent an alkyl, aryl, and aralkyl radical) in ortho-position to the azo-groups, and R' the radical of an unsulfonated 4-oxynaphthalene-1-arylketone, the dyes being of orange to violet blue tints.

17. Materials dyed with the new azo-dyestuffs resulting from the action of unsulfonated diazo-compounds on the unsulfonated derivatives of the 4-oxynaphthalene-1-arylketones corresponding with the general formula $$R'-N=N-R$$

wherein R signifies an unsulfonated aromatic complex comprising, besides other eventual substituents, a group —O—R (wherein R may represent an alkyl, aryl and aralkyl radical) in ortho-position to the azo-groups, and R' the radical of an unsulfonated 4-oxynaphthalene-1-arylketone, the dyes being of orange to blue red tints.

In witness whereof we have hereunto signed our names this 20th day of January, 1923, in the presence of two subscribing witnesses.

GUILLAUME DE MONTMOLLIN.
GÉRALD BONHÔTE.
JOSEF SPIELER.

Witnesses:
ARMAND GRAUN,
MARGUERITE STAEHELI.